O. H. BROWN.
TIRE GUARD.
APPLICATION FILED APR. 10, 1916.
1,212,448.
Patented Jan. 16, 1917.
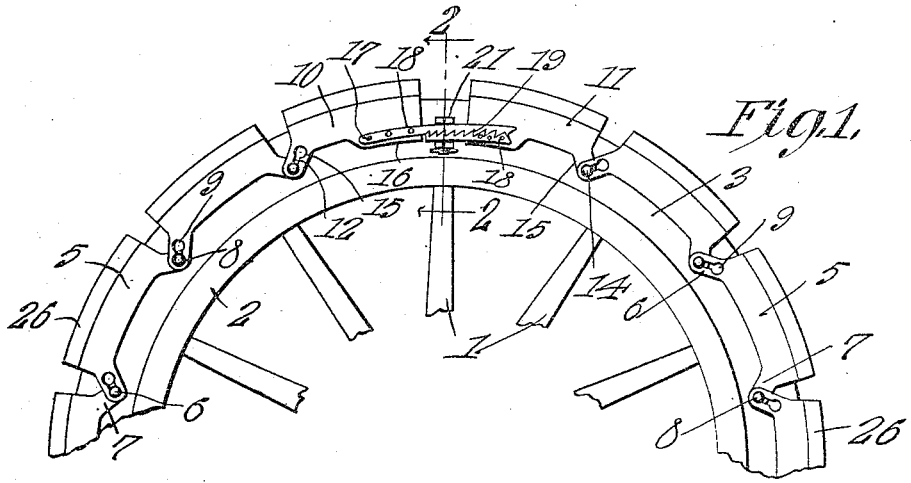
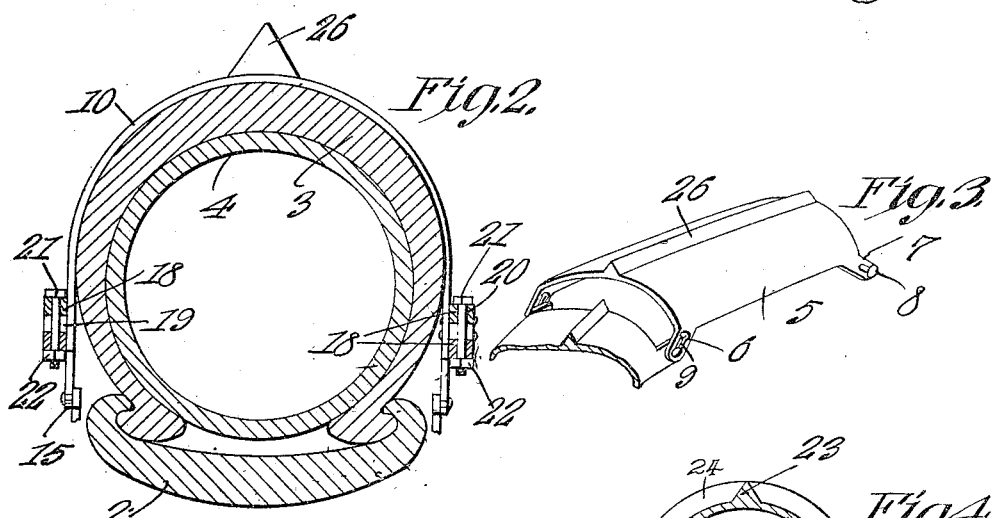
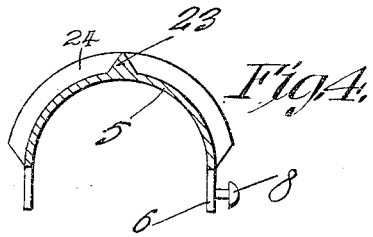
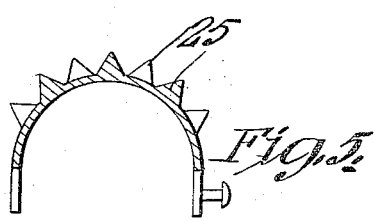
Witnesses
O. H. Brown, Inventor
by Attorneys

UNITED STATES PATENT OFFICE.

OBEDIAH H. BROWN, OF ARIEL, PENNSYLVANIA.

TIRE-GUARD.

1,212,448.   Specification of Letters Patent.   Patented Jan. 16, 1917.

Application filed April 10, 1916.   Serial No. 90,179.

*To all whom it may concern:*

Be it known that I, OBEDIAH H. BROWN, a citizen of the United States, residing at Ariel, in the county of Wayne and State of Pennsylvania, have invented a new and useful Tire-Guard, of which the following is a specification.

The device forming the subject matter of this application is a guard adapted to be applied to a wheel tire, for the purpose of protecting the tire.

The invention aims to provide novel means for connecting the sections of the guard whereby the guard may be held assembled with the tire.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows in side elevation, a portion of a wheel to which the guard forming the subject-matter of this application has been applied; Fig. 2 is a cross section on the line 2—2 Fig. 1; Fig. 3 is a perspective showing a portion of the guard; Fig. 4 is a cross section showing a modification; and Fig. 5 is a cross section showing a still further modification.

In Fig. 1 of the drawings, the numeral 1 designates spokes constituting a part of a wheel including a rim 2 carrying a tire of any desired form, the tire in the present instance, but not necessarily, embodying a casing 3 inclosing an inner tube 4.

Surrounding the tire, whatever be its form, is a guard, preferably made of metal, and including a plurality of trough-shaped intermediate sections 5. At one end, each of the sections 5 is equipped with ears 6, and at its other end, each of the sections is provided with ears 7. The ears 6 and 7 project slightly beyond the ends of the sections and are inclined toward the center of the wheel. In each ear 7 is a headed stud 8 and in each ear 6 a keyhole slot 9 is formed. As will be understood readily, the heads of the studs 8 may be passed through the enlarged portions of the keyhole slots 9, and when relative longitudinal movement between the sections 5 is produced, the shanks of the studs 8 will move into the reduced portions of the keyhole slots 9; and thus all of the intermediate sections 5 will be united pivotally. The invention includes, further, end sections denoted respectively by the numerals 10 and 11, these end sections being of trough shape in cross section, like the intermediate sections 5. At one end, the section 10 is provided with key-hole slots 12, and at one end, the section 11 is provided with headed pins 14, the pins and slots being of the sort hereinbefore set forth, and constituting means whereby the end sections 10 and 11 may be assembled pivotally with the adjoining intermediate sections 5. The inner or adjacent ends of the sections 10 and 11 are provided with wings 16 extended toward the hub of the wheel, and it is to be understood that the pins 14 and the slots 12 are carried by ears 15, constructed like the ears 6 and 7 of the intermediate sections 5. By means of attaching elements 17, racks 18 are secured to the outer faces of the wings 16 of the end sections 10 and 11. The racks 18 include facing interengaging teeth 19. In the racks 18 circumferentially elongated vertical openings 20 are formed, the vertical openings being adapted to receive securing devices 21 of any desired sort. In the present instance, the securing devices 21 are in the form of bolts carrying nuts 22, but any equivalents for the nuts 22 may be resorted to.

The tread portions of the sections which make up the guard may be variously constructed. Thus, as shown in Figs. 1, 2 and 3, the sections are equipped with longitudinal ribs 26. However, longitudinal ribs 23 and any desired number of transverse ribs 24 may be employed, as shown in Fig. 4, or, if considered desirable, the ribs may be replaced by prongs 25, as indicated in Fig. 5.

In practical operation, the guard is placed about the tire, as shown in Fig. 1, and the teeth 19 of the racks 18 are held interlocked by the securing devices 21. If the tire now be inflated, until it bears firmly against the guard, the guard will be held in place. The guard, however, may be placed on the tire after the tire has been inflated, and under such circumstances, the guard is contracted circumferentially by a suitable tool of any sort. There are many tools adapted for this purpose, and since such a tool cannot be claimed in this application, I have shown none. When the guard is contracted circumferentially, the teeth 19 of the racks 18 ride over each other until the guard is tightened sufficiently, whereupon the teeth interlock. The securing devices 21 are then mounted in place to prevent an accidental separation of the racks 18.

Note Fig. 1 of the drawings, and let it be supposed that the guard is placed loosely about the tire. Suppose, also, that a tightening tool is engaged with the left hand end of the section 10 and with the right hand end of the section 11. When the tightening tool, arranged as above described, is operated to tighten the guard circumferentially, the left hand section 10 tends to move outwardly, owing to the inclination of the slot in the left hand end thereof, and the section 11 tends to move inwardly, owing to the slant of the slot in the section to the right of the section 11. The section 10, in view of the foregoing, moves outwardly, and the section 11 moves inwardly, when the guard is tightened. This operation tends to separate the teeth of the two racks 18, so that the racks may slide readily on each other. After the necessary adjustment has been obtained in this way, the bolt 21 may be tightened to hold the racks together. It is of course obvious that when the guard is first placed around the tire, and before the tightening member is applied thereto, the studs 8 will not be at the extreme inner ends of the slots as shown in Fig. 1, but will assume such positions only after the guard has been tightened up.

Having thus described the invention, what is claimed is:—

A tire guard made up of pivotally connected trough-like intermediate and terminal sections; oppositely extended superposed interengaging racks on the inner ends of the terminal sections; and a clamping means for uniting the racks; the outer ends of the terminal sections being pivotally joined to the adjacent intermediate sections by pin and slot connections, the slots of said sections slanting at an acute angle to the radius of the guard, whereby when the terminal sections are drawn together circumferentially, the racks will move apart radially, thus facilitating the sliding movement of the racks on each other.

In testimony that I claim the foregoing as my own, I have hereto affixed my signature in the presence of two witnesses.

OBEDIAH H. BROWN.

Witnesses:
R. N. Howe,
A. C. Andrews.